United States Patent Office 3,520,847
Patented July 21, 1970

3,520,847
STABILIZED ACRYLONITRILE POLYMER
Jurgen Runge, Leipzig, and Wally Nelles, Schkopau, Germany, assignors to VEB Chemische Werke Buna, Schkopau, Germany
No Drawing. Filed Dec. 1, 1966, Ser. No. 598,155
Int. Cl. C08f 45/60
U.S. Cl. 260—45.8                                    6 Claims

ABSTRACT OF THE DISCLOSURE

Polymers comprised of at least 20% by weight of acrylonitrile are stabilized by admixing therewith maleimide or an N-substitution product of maleimide of the formula

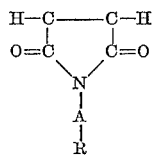

wherein A is alkylene, mononuclear arylene, or polynuclear arylene and wherein R is an aliphatic, aliphatic-aromatic, aromatic or

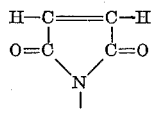

radical.

The present invention relates to the production of stabilized acrylonitrile polymers, and more particularly to a method of producing stabilized acrylonitrile polymers and stabilized articles thereof.

Still further, the invention relates to the development of a method of stabilizing polymerisates and copolymerisates of acrylonitrile and shaped bodies such as films, foils and fibers thereof, and of providing such products which do not become thermally discolored.

It is known that white polymerisates and copolymerisates of acrylonitrile exhibit the tendency of becoming yellow to brown-colored when subjected to elevated temperatures. This occurs particularly in the case of copolymerisates of acrylonitrile which are polymerized with second or third monomer components in order to provide copolymerisates with one or more other particularly good properties. To the group of monomers of this type belong, for example, vinylacetate, which improves the textile properties of fibers of acrylonitrile copolymers, but which at the same time introduces a bad influence with respect to thermostability. The same applies, for example, to acrylic amide, methylvinyl pyridine, unsaturated carboxylic acids, and to some extent also to acrylic acid esters when used as comonomers for acrylonitrile copolymerisates.

Consequently, the procedures for working up of such copolymerisates of acrylonitrile to pure white formed articles such as textiles and foils are of strictly limited scope, since the usual technique cannot be managed without the use of heat.

It has already been suggested to mix acrylonitrile polymerisates and copolymerisates thereof with specific substances which have the tendency of reducing the heat coloring of the polymerisates either entirely or partially. Thus, for example, among the substances mentioned have been: unsaturated compounds such as salts of vinylphosphonic acid (U.S. Pat. No. 2,784,169), salts of vinylsulfonic acid (U.S. Pat. No. 2,772,250), salts and esters of acrylic acid (U.S. Pat. No. 2,784,172), salts, esters and the anhydride of cinnamic acid (U.S. Pat. No. 2,775,574), maleic acid and anhydride, salts and esters thereof (U.S. Pat. No. 2,661,347, U.S. Pat. No. 2,719,140, U.S. Pat. No. 2,661,345, U.S. Pat. No. 2,661,346, U.S. Pat. No. 2,617,784), and salts of fumaric acid (U.S. Pat. No. 2,792,380).

All of these methods, however exhibit various difficulties. Thus, for example, the stabilization action against heat decolorizing is often very unsatisfactory. Furthermore, in many cases the substances have too great a degree of water solubility so that, for example, in the spinning process they are washed out in the aqueous precipitation bath. This is particularly so in the case of maleic acid and its easily hydrolyzable anhydride, which themselves exhibit a good thermostabilizing action.

It is accordingly a primary object of the present invention to provide substances which prevent thermal decolorizing of acrylonitrile polymers and copolymers thereof without any of the disadvantages as mentioned above in connection with known agents of this type.

It is another object of the present invention to provide for the stabilization of acrylonitrile polymers and copolymers thereof against decolorizing even when the same are worked up into shaped bodies, whereby the stabilizing action is achieved without in any way deleteriously affecting the other properties of the resulting polymer.

It is yet a further object of the present invention to provide the use of substances which are resistant against hydrolysis and which are either insoluble or difficultly soluble in water, which substances result in improved stability and resistance against decolorizing upon heating of acrylonitrile polymers and copolymers thereof.

Other objects and advantages of the present invention will be apparent from a further reading of the specification and of the appended claims.

With the above and other objects in view, the present invention mainly comprises incorporating into an acrylonitrile polymer or copolymer a thermostabilizing amount of a compound which contains in its molecule at least one radical of the following structure:

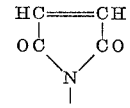

The preferred thermostabilizing compounds for addition to acrylonitrile polymers and copolymers according to the present invention are maleimide or an N-substitution product of maleimide of the formula:

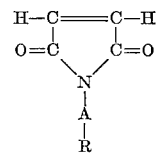

wherein R is selected from the group consisting of aliphatic, cycloaliphatic, aliphatic-aromatic (if desired substituted), aromatic and hetercyclic radicals, as well as hydrogen, halogen, cyano-, nitro-, unsubstituted amino-, and hydrocarbon radical-substituted amino groups. The substituent R may, according to a preferred embodiment of the present invention, be the radical:

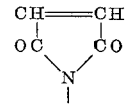

in which case the compound is a bis-maleic acid imide of the formula:

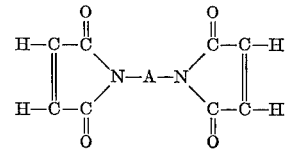

In either of the above formulas, the substituent A may be a straight chain or branched chain alkylene radical, a non-substituted or further substituted mononuclear or polynuclear arylene, or a heteroarylene radical, or the group >C=O, >C=S, >SO, >SO$_2$ or an -alkylene-x-alkylene-, -alkylene-x-arylene- or -arylene-x-arylene- radical wherein $x$ may be >NH, >C=O, alkylene, —S—, >C=S, —SO—, —SO$_2$—, or —O—.

According to the present invention, the desired stabilization of the acrylonitrile polymers and mixed copolymers is achieved by the addition of one or more stabilizers of the above type in amounts of as little as 0.01% by weight, and as high as 10% by weight. The most preferred amount is about 0.1–5%, calculated with respect to the weight of the polymerisate. The addition is made to the finely divided form of the pulverized polymerisate with which the stabilizer is mechanically mixed, or by adding a solution of the stabilizer or of a mixture of stabilizers in an inert solvent to the polymerisate and then evaporating the solvent.

In addition, stabilization of the shaped bodies such as films and fibers of the above mentioned polymerisates can be obtained by adding the stabilizer to the solution of the polymerisate in one of the solvents of usual type. It is a particular advantage of the present invention that the stabilizing action of the mentioned substances is obtained in a particularly effective manner when the polymerisate solution is mixed with the substance only shortly before the further working up thereof, though not before or during the dissolving process.

It is further possible to add the stabilizer or mixture of stabilizers to the finished body after the production thereof, by a post-treatment, for example by immersion thereof in a solution of the stabilizer or stabilizers.

The present invention is applicable to all types of acrylonitrile polymers containing, for example, from 20–100% of acrylonitrile, the acrylonitrile polymers possibly being copolymers with up to 80% of one or more compounds which have a double bond between two carbon atoms and which can be copolymerized with the acrylonitrile, i.e., ethylenically unsaturated monomers other than acrylonitrile. The known fiber-forming acrylonitrile copolymers are thus stabilized in accordance with the present invention.

Acrylonitrile polymerisates and copolymerisates thereof, and bodies made therefrom are stabilized in excellent manner against heat decolorizing by the addition of maleic acid imides and bis-maleic acid imides thereto in stabilizing amounts in accordance with this invention. This applies also for acrylonitrile copolymerisates with otherwise very poor thermostability. By suitable substitution of the two types of compounds, which can be done by known methods, stabilizers are producible which are difficultly soluble in water or are entirely insoluble. Maleic acid imide and bis-maleic acid imide exhibit, moreover, in contrast to, for example, maleic acid anhydride, a good resistance against hydrolysis. The stabilizing action of the compounds of the present invention against decolorizing by heat of acrylonitrile polymers is furthermore independent of the method of production of the polymerisate.

The present invention is further illustrated by the following examples. The scope of the invention is not, however, meant to be limited to the specific details of the examples.

EXAMPLE I

Polyacrylonitrile powder is mixed with various maleic acid imides, in the amounts given in Table 1 below.

The test samples were then heated in an oil bath for sixty minutes at 180° C., and after cooling, the degree of whiteness was measured by means of a Zeiss leukometer (blue filter 459 Nm., half value breadth 42 Nm.) in comparison to the degree of whiteness of magnesium oxide (97.4%), and the results thereof are set forth in Table 1 below:

TABLE 1

| Stabilizer | Weight percent | Degree of whiteness, percent |
|---|---|---|
| Without stabilizer, not heated | | 94 |
| Without stabilizer, heated | | 59 |
| Maleic acid imide | 0.1 | 67 |
| Do | 0.5 | 74 |
| Do | 1 | 75 |
| N-n-butylmaleic acid imide | 0.5 | 71 |
| N-p-bromophenylmaleic acid imide | 0.1 | 62 |
| Do | 0.5 | 71 |
| Do | 1 | 73 |
| N-o-tolylmaleic acid imide | 0.5 | 73 |
| N-α-naphthylmaleic acid imide | 0.5 | 74 |
| N-benzylmaleic acid imide | 0.5 | 74 |
| N,N'-p-phenylene-bis-maleic acid imide | 0.5 | 78 |

EXAMPLE 2

A finely pulverized polymerisate consisting of 92% acrylonitrile 7% styrene and 1% acrylic acid is mixed with N-phenylmaleic acid imide. Heating and reflection measurements are carried out as in Example 1, and the values are set forth in Table 2 below:

TABLE 2

| Stabilizer | Weight percent | Degree of whiteness, percent |
|---|---|---|
| Without stabilizer, heated | | 16 |
| N-phenylmaleic acid imide | 0.5 | 30 |
| Do | 1.0 | 48 |
| Do | 2.0 | 55 |

EXAMPLE 3

A finely pulverized copolymerisate consisting of 93% acrylonitrile and 7% vinylacetate is mixed with N,N'-p-phenylene-bis-maleic acid imide. Heating and whiteness measurements are carried out as in Example 1, and the values are set forth in Table 3 below:

TABLE 3

| Stabilizer | Weight percent | Degree of whiteness, percent |
|---|---|---|
| Without stabliizer, heated | | 27 |
| N,N'-p-phenylene-bis-maleic acid imide | 0.1 | 31 |
| Do | 0.5 | 49 |
| Do | 1.0 | 57 |

The same copolymerisate being mixed with 1% of N,N'-p-phenylene-bis maleic acid imide is dissolved by stirring for one hour at 100° C. to a 20% solution in dimethyl formamide, the solution after cooling being drawn to a foil, the same after evaporation of the solvent at normal temperatures being heated for three hours to 160° C. In addition, from the same copolymerisate as described above, a 20% solution is formed in which after cooling, 1% of N,N'-p-phenylene-bis-maleic acid imide, calculated with respect to the weight of the polymerisate is dissolved by stirring for a short time, after which foils are formed therefrom, and these are heated as described above. The coloring grades are set forth in Table 4 below:

TABLE 4

| Foil: | Color tone |
|---|---|
| Unstabilized | Brownish orange. |
| Stabilized before solution | Yellow. |
| Stabilized after solution | Light yellow. |

While the invention has been illustrated in particular with respect to certain specific maleic acid imides, and bis-maleic acid imides, and certain specific acrylonitrile polymers and copolymers, it is to be understood that variations and modifications thereof can be made without departing from the spirit or scope of the invention. Such variations and modifications are accordingly meant to be comprehended within the meaning and scope of equivalents of the appended claims.

What is claimed is:

1. A composition comprising a polymer constituted of at least 20% by weight acrylonitrile and any balance at least one ethylenically unsaturated compound copolymerized therewith, said polymer being in admixture with a compound which is maleimide or an N-substitution product of maleimide of the formula:

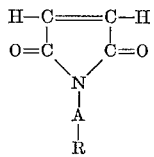

wherein A is an alkylene, mononuclear arylene, or polynuclear arylene group and wherein R is an aliphatic, aliphatic-aromatic, aromatic or

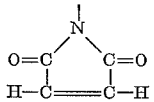

radical.

2. Composition according to claim 1, wherein said compound is a bis-maleic acid imide of the formula:

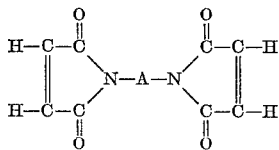

wherein A is an alkylene, mononuclear arylene or polynuclear arylene radical.

3. Composition according to claim 1, wherein said compound is maleic acid imide, N-n-butyl maleic acid imide, N-p-bromophenyl maleic acid imide, N-o-tolylmaleic acid imide, N-α-naphthylmaleic acid imide, N-benzylmaleic acid imide, N,N'-p-phenylene-bis-maleic acid imide, or N-phenylmaleic acid imide.

4. Composition according to claim 1, wherein said polymer consists essentially of 100% acrylonitrile.

5. Composition according to claim 1, wherein said compound is present in an amount of between about 0.01 and 10% of the weight of said polymer.

6. A shaped article constituted of a composition comprising a polymer consituted of at least 20% by weight acrylonitrile and any balance at least one ethylenically unsaturated compound copolymerized therewith, said polymer being in admixture with a compound which is maleimide or an N-substitution product of maleimide of the formula:

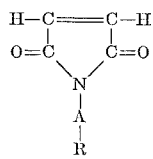

wherein A is an alkylene, mononuclear arylene, or polynuclear arylene group and wherein R is aliphatic, aliphatic-aromatic, aromatic, or

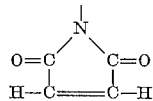

radical.

References Cited

UNITED STATES PATENTS

| | | | |
|---|---|---|---|
| 2,841,569 | 7/1958 | Rugg et al. | 260—45.8 XR |
| 2,897,208 | 7/1959 | Phillips et al. | 260—45.8 XR |
| 2,911,387 | 11/1959 | Vandenberg | 260—45.95 XR |
| 3,105,059 | 9/1963 | van der Burg | 260—45.8 |
| 3,256,237 | 6/1966 | Casey | 260—45.8 |
| 3,344,096 | 9/1967 | Manasia et al. | 260—18 |

DONALD E. CZAJA, Primary Examiner

M. J. WELSH, Assistant Examiner

U.S. Cl. X.R.

260—45.7, 45.85